Patented Nov. 13, 1928.

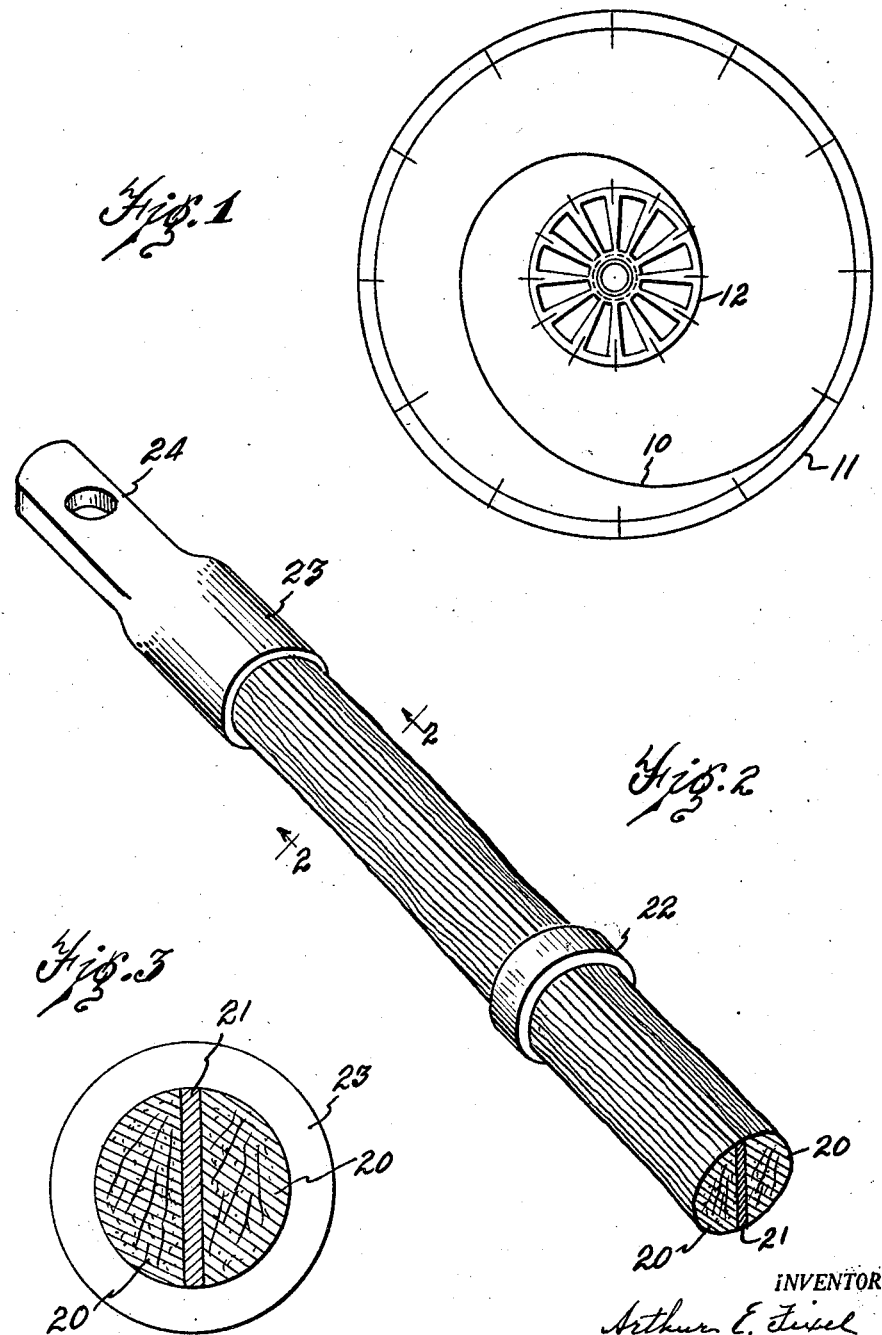

1,691,711

UNITED STATES PATENT OFFICE.

ARTHUR E. FIXEL, OF DETROIT, MICHIGAN.

PARACHUTE.

Application filed August 13, 1926. Serial No. 128,946.

The present invention relates to parachutes and more especially to the construction of parachutes particularly adapted for use in connection with the safety devices described and claimed in prior applications Serial No. 44,232, filed July 17, 1925, and Serial No. 67,809, filed Nov. 9, 1925, by the present inventor.

In the previous applications parachutes are described having flexible but resilient ribs and the present application covers an improved form of rib.

Among the objects of this invention is a rib which shall be flexible and resilient and which shall be easy and economical to construct and efficient in operation.

Another object is a rib which will maintain its resilience although kept flexed for a considerable time.

Other objects will readily appear to those skilled in the art upon reference to the accompanying drawings in which:—

Fig. 1 is a perspective view of one end of a rib embodying the invention;

Fig. 2 is a section on line 2—2 of Fig. 1;

Fig. 3 is a diagrammatic view showing the method of packing the parachute as described and claimed in the prior applications.

In said prior inventions the parachute is packed in a container with the ribs arranged spirally, one rib being indicated at 10. The container is indicated at 11 while the central element of the parachute, to which the ribs are hingedly secured is indicated at 12.

The present rib is especially suitable for such use and is shown in Figs. 2 and 3 to be made up of two outer parts 20 which may be of a suitable fibrous material such as cordage or a material of vegetable origin such as rattan, the latter being preferred. These two parts will have between them a non-adhering narrow flat strip of resilient metal 21 such as spring steel and the several pieces will be held together by suitable rings 22 placed at intervals the length of the rib.

At one end, the several pieces will be securely fixed in a ferrule 23 provided with means 24 for securing to center member 12 while the attachment at the other end will allow for relative longitudinal movement on flexure.

The rib will be secured to the cloth cover of the parachute in the usual manner and the latter will of course be provided with cords supporting the occupant.

Having now described the invention and the preferred form of embodiment thereof it is to be understood that the said invention is not to be limited to the specific details herein described and illustradted but only by the scope of the claims which follow.

I claim:—

1. A flexible rib for parachutes, consisting of outer portions of fibrous material and a non-adhering intervening strip of springmetal.

2. A flexible rib for parachutes, consisting of outer portions of fibrous material and a non-adhering intervening strip of spring steel.

3. A flexible rib for parachutes, consisting of outer portions of rattan and a non-adhering intervening strip of spring metal.

4. A flexible rib for parachutes, consisting of outer portions of rattan, an intervening strip of spring metal and means for securing the parts together, said means permitting relative longitudinal movement on flexure.

5. A flexible rib for parachutes, consisting of outer portions of rattan, an intervening strip of spring metal, means for securing the parts together, said means permitting relative longitudinal movement on flexure and a ferrule at one end of said rib secured to said parts and providing means by which the rib may be hinged to the center member of a parachute.

ARTHUR E. FIXEL.